July 15, 1958
C. O. FINN
2,842,897
FIBRE MATS AND METHOD OF AND APPARATUS
FOR MAKING THE SAME
Filed Aug. 11, 1953
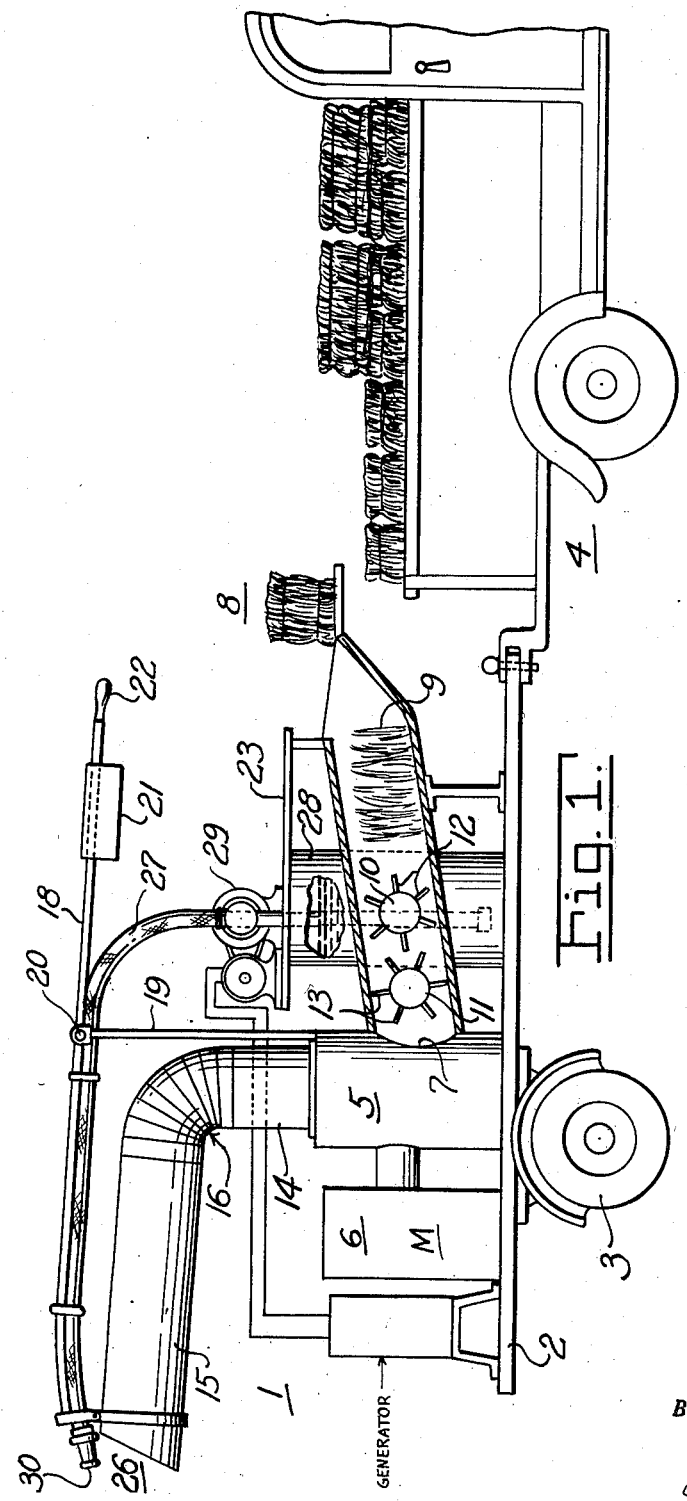
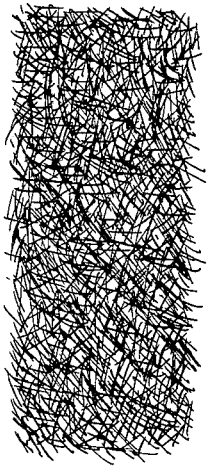
INVENTOR.
CHARLES O. FINN
BY
Zugelter & Zugelter
Attys.

United States Patent Office 2,842,897
Patented July 15, 1958

2,842,897

FIBRE MATS AND METHOD OF AND APPARATUS FOR MAKING THE SAME

Charles O. Finn, Cincinnati, Ohio, assignor to The Finn Equipment Company, Cincinnati, Ohio, a corporation of Ohio Application August 11, 1953, Serial No. 373,563

6 Claims. (Cl. 47—9)

This invention relates to fibre mulch mats, and to a method of and apparatus for making the same.

The invention is particularly adapted for making mulch mats as a cover for terraces and other soil areas where water and air erosion make the growing of grass and other vegetation difficult.

An object of this invention is to provide a fibre mulch mat in which the individual fibres are secured to each other by spots of adhesive on the individual fibres.

Another object of the invention is to provide a fibre mulch mat that can be laid in place as it is being formed.

A further object of the invention is to provide a method of forming fibre mats in place by spreading the fibres with air as a vehicle, and injecting into the fibre-laden air a fog or mist of adhesive, to thereby spot on the surface of the fibres the adhesive by which the fibres are united as a continuous mat, and tacked down on the surface to be covered.

And a still further object of the invention is to provide apparatus for spreading fibres in a vehicle of air, and injecting into the vehicle laden with fibre, a fog or mist of adhesive to thereby spot the fibres with the same.

Other objects and features of the invention will be apparent to those of ordinary skill in the art to which the invention pertains, from the following description taken in conjunction with the accompanying drawing.

In the drawing:

Figure 1 is a more or less schematic view of a device for spreading fibres in a vehicle of air, into which is injected a fog or mist of adhesive;

Fig. 2 is a fragmentary top plan view of a fibre mat embodying the invention, and made in accordance with the method thereof;

Fig. 3 is an edge view of the mat shown in Fig. 2; and

Fig. 4 is a view of a fibre, such as straw, on which there are spots of adhesive by means of which the fibres, when laid at random on soil, are caused to adhere to one another.

In the drawing is illustrated a device 1, mounted on a chassis 2 provided with wheels 3, whereby the device may be transported or towed by means of a truck 4, or other vehicle. Device 1 is illustrated only schematically, but, as illustrated, includes a blower 5 driven by a motor 6, such as an internal combustion engine. The blower 5 receives, at its inlet 7, fibres, such as straw fibres or other suitable fibres, as illustrated in Fig. 4. The fibres may be carried on the device 1 in the form of bales 8, and these bales are fed into a chute 9, where they are broken up by rollers 10 and 11 having spikes 12 and 13 thereon, respectively. The rollers 10 and 11 may be driven by the motor 6 through any suitable drive. The spikes 12 and 13 on the rollers 10 and 11, break up the straw fibre in the bales into relatively uniform lengths of approximately four to eight inches. The fibre thus broken up is taken into the intake of fan 5 and blown out through an outlet pipe 14 and a discharge pipe 15, which is connected to the outlet pipe by a flexible elbow 16. The pipe 15 is supported by rod 18, which is pivotally secured to an upright support 19 by a pivot pin 20.

Rod 18 has a counterweight 21 thereon, and a handle 22 by means of which an operator riding on the machine or standing, for example, on a platform 23, may swing the pipe 15 through an horizontal arc of approximately 360°, and which may be raised or lowered vertically through an angle of say 40° to 60°. The air supplied by the blower 5 is the vehicle for the particles of fibre taken into it, and the air, laden with fibres, discharges at 26. The velocity of the air and the volume thereof is such as to project the fibres a substantial distance, so that a wide area may be covered.

In order that the fibres may be caused to adhere to one another when they come to rest on the surface to be covered, as, for example, on a terrace or on the berm of a highway, or other place where it is necessary to obtain grass growth to minimize or prevent erosion by water or wind, means are provided for spotting the fibres with adhesive. The means illustrated comprises a flexible conduit 27, one end of which is connected to a tank 28 in which a supply of adhesive is contained. A motor-driven pump 29 pumps the adhesive out of the container into the conduit 27 and discharges the same through a nozzle 30. The nozzle is of such construction that the adhesive is broken up into a mist or fog, and directed into the air stream containing the fibres. The fibres are thereby spotted at random with adhesive, so that when the fibres come to rest on the surface to be covered, a mat is formed as shown in Fig. 2. The fibres in that mat are arranged at random, criss-crossing each other. The spots of adhesive will cause the fibres to stick together and form a continuous porous mat. A mat, such as shown in Figs. 2 and 3, when formed in place on a ground surface such as the terrace of a highway or other embankments, will lie tightly on the ground. It is not necessary to stake the mat down with twine, wires or the like, and wind will not blow the mat away.

A mat constructed in place, in accordance with the procedure above described, being porous, will not interfere with the rain penetrating the same into the soil surface below, and neither will it interfere with growth of grass or other vegetation. The mat not only impedes and arrests erosion, but also serves to hold moisture in the ground by impeding run-off, and also by delaying evaporation of moisture from the soil.

Mats, such as shown in Figs. 2 and 3, may be made in accordance with the method of this invention and by the apparatus illustrated, of any thickness. The mulch mat ordinarily is of about two inches in thickness, but it may be made thicker or thinner, as circumstances require.

The fibres of the mat may consist of straw, hay or other fibre, whichever is most economical in use. The adhesive may be asphalt, varnish, phenol formaldehyde resins in liquid tacky form, that will set up sufficiently to form a bond between fibres and the like. The particular adhesive used is governed by cost considerations. I therefore prefer to use asphalt or cut-back asphalt, which is an asphalt that has been thinned down with a solvent such as gasoline or kerosene, to a viscosity suitable for the purpose. It has been found that a cut-back asphalt will provide a suitable mist or fog when its viscosity is of the order of the viscosity of No. 10 motor oil.

Having thus described the invention, it will be apparent to those skilled in the art to which the invention pertains, that various modifications and changes may be made in the illustrated embodiments and the described method, without departing from either the spirit or the scope of the invention.

Therefore, what is claimed as new and desired to be secured by Letters Patent is:

1. A method of spreading over soil areas, erosion controlling fibre mulches such as straw, hay and the like, and tacking the fibres to each other as a porous mat, that consists in developing a confined strong current of air, discharging said confined stream into the atmosphere, feeding fibres to the confined current of air to be carried thereby to areas on which the fibres are to be spread, and injecting a fog of water insoluble adhesive material into the discharged air stream containing the fibres, whereby the fibres are spotted at random with adhesive and caused to adhere, one to another, when at rest on said areas.

2. A method of forming mats for covering soil areas, that consists in supplying fibres in a stream of air as a vehicle, discharging said air and fibres into the atmosphere over said areas and supplying a fog of adhesive into said discharged stream of air and fibres, thereby depositing on said fibres spots of the adhesive, whereby the fibres, when deposited on the soil areas, form a mat in which the individual fibres are secured, one to another.

3. A method according to claim 2, in which the adhesive is a cut-back asphalt having a viscosity of the order of No. 10 motor oil.

4. A mulch mat for covering soil, to minimize erosion and for holding moisture in the soil, that comprises layers of fibres of vegetable matter having random spots of adhesive on the surface thereof whereby the individual fibres are secured to each other.

5. Apparatus for spreading fibrous materials over soil areas and tacking the fibres to each other by adhesive, to form a mat that comprises a blower for developing a strong current of air, a spout connected to the outlet of the blower and through which the air is discharged, means for supplying fibres to the blower, whereby the fibres are carried into the air stream and discharged from the spout, and means for supplying into the air stream containing the fibres as it leaves the spout, a fog of water insoluble adhesive, whereby the fog of adhesive is carried along by the air stream containing the fibres, to form spots of the adhesive on the fibres whereby, when the same come to rest on the soil areas, the individual fibres are tacked, one to another, by said adhesive, thereby forming a mat on such areas.

6. A method of spreading fibre mulches such as straw, hay and the like, and tacking the fibres to each other as a porous mat, that consists in developing a confined strong current of air, discharging said confined stream into the atmosphere, feeding fibres to the confined current of air to be carried thereby to areas on which the fibres are to be spread, and injecting a fog of cut-back asphalt having a viscosity of the order of No. 10 motor oil into the discharged air stream containing the fibres, to thereby spot the fibres with said asphalt and causing them to adhere, one to another, when at rest on said areas.

References Cited in the file of this patent

UNITED STATES PATENTS

| | | |
|---|---|---|
| 887,693 | Richmond | May 12, 1908 |
| 891,299 | Smith | June 23, 1908 |
| 1,718,507 | Wenzel | June 25, 1929 |
| 1,800,003 | Allstott | Apr. 7, 1931 |
| 1,882,377 | Whittelsey | Oct. 11, 1932 |
| 1,888,841 | Wenzel | Nov. 22, 1932 |
| 1,900,614 | Poirot | Mar. 7, 1933 |
| 1,900,615 | Poirot | Mar. 7, 1933 |
| 2,161,508 | Ensor | June 6, 1939 |

FOREIGN PATENTS

| | | |
|---|---|---|
| 261,909 | Germany | July 3, 1913 |